March 9, 1937.   E. W. FAWCETT ET AL   2,073,202
VACUUM DISTILLATION
Filed March 7, 1935   2 Sheets-Sheet 1
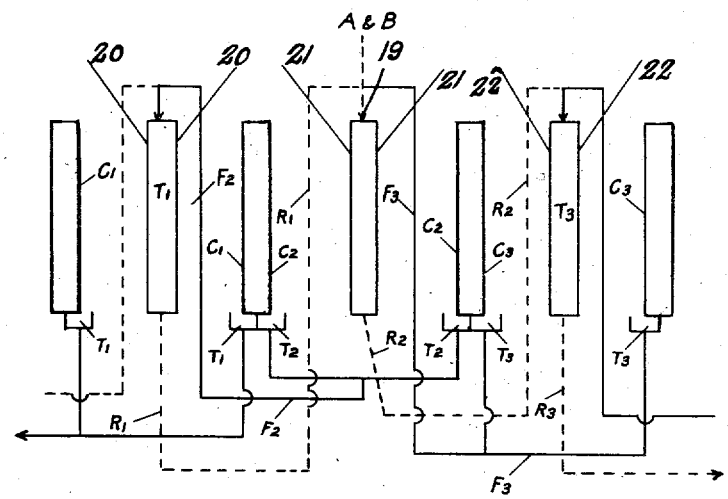
Fig. 1.
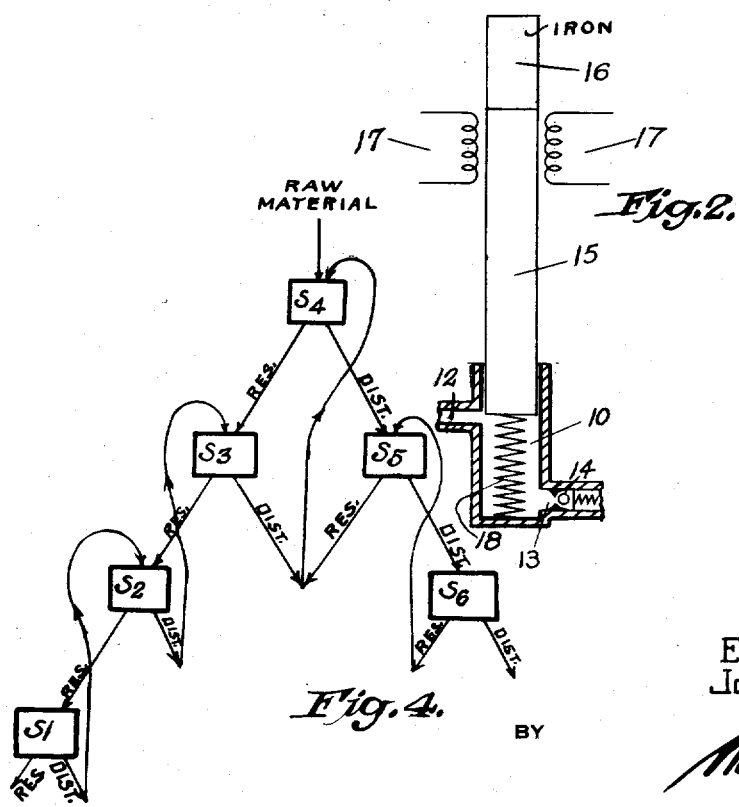
Fig. 2.
Fig. 4.
INVENTORS
Eric William Fawcett
John Lewis McCowen
BY
ATTORNEY

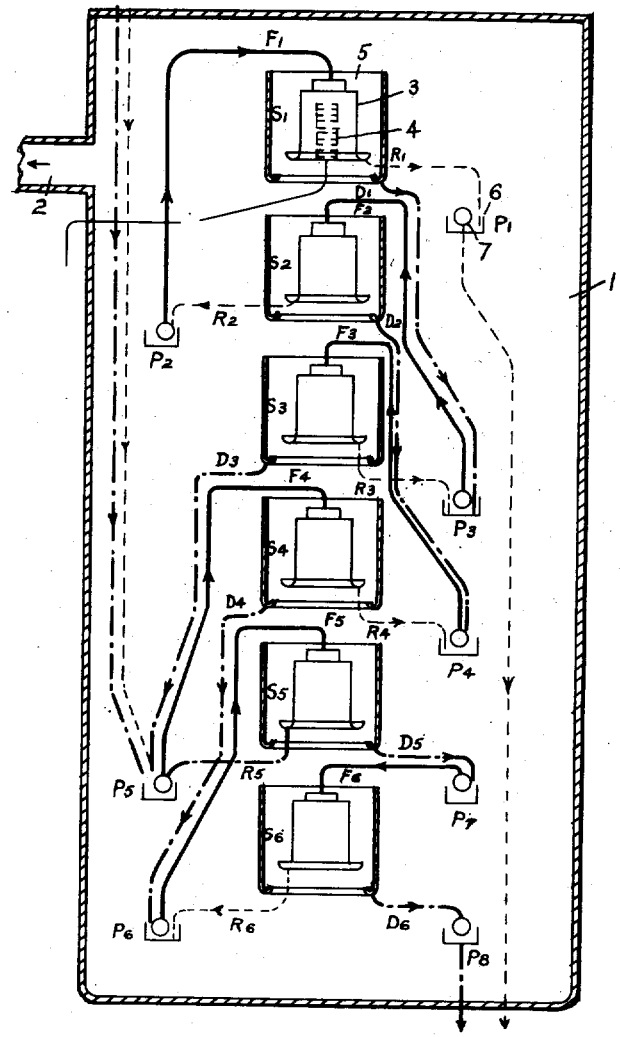

Patented Mar. 9, 1937

2,073,202

UNITED STATES PATENT OFFICE 2,073,202

VACUUM DISTILLATION

Eric William Fawcett and John Lewis McCowen, Northwich, England, assignors to Imperial Chemical Industries Limited, a corporation of Great Britain Application March 7, 1935, Serial No. 9,872
In Great Britain March 7, 1934

3 Claims. (Cl. 202—205)

The invention relates to the vacuum distillation of substances under conditions of high vacua, the distilling and the condensing surfaces being in very close proximity to each other, and more especially to apparatus therefor.

More particularly the invention relates to operation under the conditions of so-called molecular distillation, in which the distance between the condensing surface and the distillation surface is of the order of the mean free path of the distilling molecules at the pressure within the apparatus. For practical purposes, this involves the use of pressures of the order of $10^{-3}$–$10^{-5}$ mms. of mercury and even lower pressures.

As is already known, it is often possible under the aforementioned conditions to effect the separation of the constituents of substances which cannot be distilled under ordinary pressures or moderate vacua. Further, by collecting the distillate and/or residue of high vacuum distillation in fractions, it is sometimes possible to effect an improved separation with respect to particularly desired products. Nevertheless this does not always lead in a single operation to a sufficiently good separation in the case of substances having near vapour pressures and molecular weights.

The object of the present invention is to provide a means for improving the separation by fractional high-vacuum distillation of a substance or mixture of substances. A further object of the present invention is to provide means for the continuous treatment by fractional high-vacuum distillation of a substance or mixture of substances.

From a theoretical standpoint it would be desirable to approach as nearly as possible to the conditions existing in an ordinary liquid fractionating column, but the peculiar conditions of high vacua and the arrangement of the distilling and condensing surfaces in carrying out molecular distillation make this out of the question. It is necessary to collect the distillate at such a temperature that its vapour pressure is negligible compared with the pressure existing in the apparatus. Vapour phase transfer from stage to stage is hence impossible.

According to our invention we provide a plurality of distillation units housed in a common vacuum chamber, connected to a high vacuum pumping system, the distilling and condensing surfaces of each unit being in close proximity (of the order of one or a few centimetres apart) and their temperatures being independently adjustable in all the units. Means are provided for continuously feeding liquid material to the distilling surface and for collecting liquid condensate from the condensing surface of each unit, and equilibrium conditions are thus established, the temperature at the distilling surface of each unit being sensibly constant. Means are also provided, comprising suitable conduits and pumps, for transferring distillates and residues from one unit to another in counter-current fashion, as will be more fully explained below.

If each unit were separately connected to a vacuum pump the apparatus would be cumbersome and difficult to maintain in good order on account of the large number of vacuum tight joints that would have to be made. Also, heat losses would be an important factor. By housing all the units in a common vacuum chamber the apparatus is greatly simplified and is made much more reliable. All the units, including accessory conduits and pumps, are thermally insulated, by the high vacuum, from the external atmosphere, and heat losses are largely eliminated. Temperature control is also rendered more efficient since the units are not subject to draughts.

The use of a common vacuum chamber also has the advantage that the necessary high vacuum can be more readily attained than in a comparatively small space. Thus the exhaust pipe connecting the chamber to the vacuum pump can be of very large diameter and free from sharp ends. The pumping speed is approximately proportional to the cube of the exhaust pipe diameter, and is consequently high, which is an important factor in high vacuum technique.

In the accompanying drawings we have shown, more or less diagrammatically, two examples of specific embodiments of apparatus within the purview of the invention, and a chart further illustrating flow of materials through the apparatus. In the showings, Fig. 1 is a diagrammatic view of one form of apparatus, having a compact arrangement of hot and cold surfaces, Fig. 2 shows one form of electric pump suitable for use in our apparatus, Fig. 3 shows a modified apparatus organization utilizing cylindrical hot and cold surfaces, and Fig. 4 is a chart diagram illustrating the flow of distillates and residues and the manner of recycling.

Referring to the drawings, and particularly to Fig. 3, a vacuum chamber 1, connected to the pumping equipment (not shown) via the conduit 2, contains a number ($S_1$, $S_2$, $S_3$, . . .) of distillation units, each comprising a distilling surface 3, heated to an appropriate temperature by a suitable heating arrangement 4, e. g. an electric resistance heater (only one of which is shown), and a condensing surface 5, in very close proximity to the distilling surface 3. As stated the temperatures are independently adjustable in each unit. Ordinary rheostats are suitable for regulation of the heater temperatures. The residue and distillate leave the units respectively at $R_1$, $R_2 \ldots$ and $D_1$, $D_2 \ldots$ and are fed to other units, or removed from the apparatus, as the case may be. All units are provided with heaters 4; only one such heater being shown, for the sake of clarity of showing. As stated, each unit is arranged for independent adjustment of temperature.

The mixture of substances forming the initial material is fed by a pump $P_5$ to the distilling surface of one of the units, for example $S_4$, via the feed pipe $F_4$ and is distilled. The distillate, now enriched in the more volatile components, is withdrawn via $D_4$ and pumped by the pump $P_6$ to the distilling surface of the next unit $S_5$ while the residue, withdrawn at $R_4$, is pumped by $P_4$ to the distilling surface of the unit $S_3$. The said residue, now enriched in the less volatile components, undergoes a further distillation in $S_3$ and the residue from this stage, now further enriched in the less volatile components, is then fed by $P_3$ to a further stage or stages ($S_2$, $S_1$), in which stage or stages there is a further concentration of the less volatile components until eventually the desired fraction is obtained and withdrawn from the apparatus via pump $P_1$. The distillate from $S_3$ is withdrawn by $D_3$ and pumped by $P_5$ together with the fresh mixture, to the distilling surface of $S_4$. The distillate from $S_5$, further enriched in the volatile constituents, is pumped by $P_7$ to the evaporating surface of $S_6$ and so on. Eventually the desired fraction is obtained and is removed from the apparatus via $P_8$. The residue from $S_5$ is pumped by $P_5$ to the evaporating surface of $S_4$ and so on.

Fig. 4 is a diagram, based on Fig. 3 but applying equally well to the apparatus of Fig. 1, showing the course of residues and distillates through the apparatus. It is seen that in the units handling the residue of the preliminary distillation (in $S_4$), the residue passes through units $S_3$, $S_2$ and $S_1$ in that order, while the distillate is pumped backwards, that is from $S_1$ to $S_2$, $S_2$ to $S_3$ and $S_3$ to $S_4$. The situation is similar in the case of units $S_5$ and $S_6$ handling the distillate from the preliminary distillation (in $S_4$).

It will be seen that the apparatus is practically entirely self-contained (except for the high vacuum producing apparatus), all interstage pumps, distilling and condensing surfaces, etc., being housed in the one vacuum chamber. This makes for economy of heating. It is a simple matter to adjust the temperature of the heating and cooling surfaces of each unit to the optimum value.

Although for convenience the distillation units have been shown one above the other, it is obvious that they may be arranged in other ways. For example, a more practically convenient arrangement is to dispose the units more or less at the same level, e. g. in a circular arrangement, within a suitably shaped vacuum chamber.

The invention is applicable to liquids (i. e. substances liquid under the conditions of treatment), solids introduced in solution or suspension in a carrier liquid and giving liquid distillates or solid distillates in which latter case carrier liquids must again be used for their transfer from stage to stage.

In another suitable form of apparatus the distilling and condensing surfaces are arranged side by side or concentrically, leading to a very compact apparatus. Figure 1 of the drawings filed herewith illustrates one such form diagrammatically.

In this drawing 20, 21, and 22 are distilling surfaces taking the form of flat vertical plates, and $C_1$, $C_2$, $C_3$ are the corresponding condensing surfaces located a short distance from 20, 21, and 22 and of similar form thereto. The heating and cooling arrangements for these plates are not shown, but it will be understood that they may be of any known type.

The fresh liquid material to be distilled is introduced at the top of plate 21 as at 19, together with a residue from conduit $R_1$ and a condensate from conduit $F_3$. The mixture flows down the heated surfaces of 21 and a portion is distilled off and collected on the condensing surfaces $C_2$. The bottoms of these surfaces are provided with troughs $T_2$ for the collection of the condensate and the latter is passed via conduit $F_2$ to the head of the distilling surface 20 where it is joined with a residue from a further similar distilling surface if such is provided. The residue from $C_2$ is passed via conduit $R_2$ to the head of 22, where it is joined with a condensate from a still further similar distilling surface if such is provided.

It will be understood that the whole apparatus is contained in a vacuum chamber and that suitable pumps are provided for transferring the condensates and residues as described. A suitable form of pump is shown diagrammatically in Figure 2 of the drawings filed herewith. In this figure 10 is a pump chamber having an inlet 12 and an outlet 13 controlled by a ball valve 14.

The piston 15 which works in the chamber 10, is made of a non-magnetic material except for its outer extremity 16 which is made of iron. A solenoid 17 surrounds the piston and when energized operates to force it downwardly from the position shown in the drawings.

A spring 18 tends to force the piston 15 upwardly and when the inlet port 12 is uncovered liquid flows into the pump chamber by gravity. The transfer of a given quantity of liquid into the pump chamber is arranged, by means not shown, to energize the solenoid 17 and the liquid in the pump chamber is forced through the outlet 13. It will be noted that the pump is primed by gravity as under the high vacuum conditions obtaining no marked suction effect is produced by the upward movement of the piston 15. At the end of the pumping stroke the solenoid 17 is de-energized and the piston is returned by the action of the spring 18. The only connections passing through the wall of the surrounding vacuum chamber which are required for the operation of the pump are electrical leads, and the transfer of liquid material from within the vacuum chamber is carried out automatically.

Other forms of interstage pumps which may be employed in this invention are, for example, small gear or plunger pumps mechanically operated and driven by one or more electric motors, totally or partially enclosed in the vacuum vessel.

We claim:

1. Apparatus for separation of distillable materials by evaporative distillation, comprising a chamber adapted to be evacuated to a high degree of vacuum, a series of distilling units in said chamber each comprising means affording a distilling surface, heating means and means affording a condensing surface disposed closely adjacent the distilling surface, each of said units being arranged to yield in operation a distillate and a residue, one unit intermediate of the series being adapted to take raw material and yield a preliminary residue and a preliminary distillate, some of the remaining units being arranged to subject said preliminary residue from the first unit to successive distillations, and the rest of the units being arranged to subject said preliminary distillate from the first unit to successive distillations, and conduit and pump means enclosed in the chamber for recycling distillates, from each unit working on the preliminary residue, to the next unit in the series toward said intermediate unit, and for recycling residues, from each unit working on the preliminary distillate, to the next unit in the series toward said intermediate unit.

2. Apparatus for separation of distillable materials by evaporative distillation, comprising a chamber adapted to be evacuated to a high degree of vacuum, a series of distilling units in the chamber, each comprising means affording a distilling surface, heating means and means affording a condensing surface disposed closely adjacent the distilling surface, one unit intermediate of the series being arranged to receive raw material to be distilled and to yield a preliminary residue and a preliminary distillate, pump and conduit means for passing said preliminary residue seriatim through a portion of the remaining units wherein it is subjected to successive distillation, pump and conduit means for recycling distillate from each of said units to a previous unit in the series, pump and conduit means for passing said preliminary distillate seriatim through the rest of the remaining units wherein it is subjected to successive distillation, and pump and conduit means for recycling residue from each of said units to a previous unit in the series.

3. The apparatus of claim 1, wherein the pump means are electrically actuated, are hermetically enclosed within the chamber, and are supplied with electric current from outside the chamber.

ERIC WILLIAM FAWCETT.
JOHN LEWIS McCOWEN.

CERTIFICATE OF CORRECTION.

Patent No. 2,073,202.                                        March 9, 1937.

ERIC WILLIAM FAWCETT, ET AL.

It is hereby certified that error appears in the printed specification of the above numbered patent requiring correction as follows: Page 1, second column, line 31, for the word "ends" read bends; page 3, first column, lines 14 and 15, claim 1, strike out the words "enclosed in the chamber"; and that the said Letters Patent should be read with these corrections therein that the same may conform to the record of the case in the Patent Office.

Signed and sealed this 6th day of April, A. D. 1937.

(Seal)
Henry Van Arsdale
Acting Commissioner of Patents.

said chamber each comprising means affording a distilling surface, heating means and means affording a condensing surface disposed closely adjacent the distilling surface, each of said units being arranged to yield in operation a distillate and a residue, one unit intermediate of the series being adapted to take raw material and yield a preliminary residue and a preliminary distillate, some of the remaining units being arranged to subject said preliminary residue from the first unit to successive distillations, and the rest of the units being arranged to subject said preliminary distillate from the first unit to successive distillations, and conduit and pump means enclosed in the chamber for recycling distillates, from each unit working on the preliminary residue, to the next unit in the series toward said intermediate unit, and for recycling residues, from each unit working on the preliminary distillate, to the next unit in the series toward said intermediate unit.

2. Apparatus for separation of distillable materials by evaporative distillation, comprising a chamber adapted to be evacuated to a high degree of vacuum, a series of distilling units in the chamber, each comprising means affording a distilling surface, heating means and means affording a condensing surface disposed closely adjacent the distilling surface, one unit intermediate of the series being arranged to receive raw material to be distilled and to yield a preliminary residue and a preliminary distillate, pump and conduit means for passing said preliminary residue seriatim through a portion of the remaining units wherein it is subjected to successive distillation, pump and conduit means for recycling distillate from each of said units to a previous unit in the series, pump and conduit means for passing said preliminary distillate seriatim through the rest of the remaining units wherein it is subjected to successive distillation, and pump and conduit means for recycling residue from each of said units to a previous unit in the series.

3. The apparatus of claim 1, wherein the pump means are electrically actuated, are hermetically enclosed within the chamber, and are supplied with electric current from outside the chamber.

ERIC WILLIAM FAWCETT.
JOHN LEWIS McCOWEN.

CERTIFICATE OF CORRECTION.

Patent No. 2,073,202.     March 9, 1937.

ERIC WILLIAM FAWCETT, ET AL.

It is hereby certified that error appears in the printed specification of the above numbered patent requiring correction as follows: Page 1, second column, line 31, for the word "ends" read bends; page 3, first column, lines 14 and 15, claim 1, strike out the words "enclosed in the chamber"; and that the said Letters Patent should be read with these corrections therein that the same may conform to the record of the case in the Patent Office.

Signed and sealed this 6th day of April, A. D. 1937.

(Seal)                                               Henry Van Arsdale
Acting Commissioner of Patents.

CERTIFICATE OF CORRECTION.

Patent No. 2,073,202.                                                  March 9, 1937.

ERIC WILLIAM FAWCETT, ET AL.

It is hereby certified that error appears in the printed specification of the above numbered patent requiring correction as follows: Page 1, second column, line 31, for the word "ends" read bends; page 3, first column, lines 14 and 15, claim 1, strike out the words "enclosed in the chamber"; and that the said Letters Patent should be read with these corrections therein that the same may conform to the record of the case in the Patent Office.

Signed and sealed this 6th day of April, A. D. 1937.

(Seal)                                                            Henry Van Arsdale
                                                           Acting Commissioner of Patents.